United States Patent
Hird et al.

(10) Patent No.: US 8,613,065 B2
(45) Date of Patent: Dec. 17, 2013

(54) METHOD AND SYSTEM FOR MULTIPLE PASSCODE GENERATION

(75) Inventors: Geoffrey Hird, Cupertino, CA (US); Rammohan Varadarajan, Cupertino, CA (US); James D. Reno, Scotts Valley, CA (US)

(73) Assignee: CA, Inc., Islandia, NY (US)

( * ) Notice: Subject to any disclaimer, the term of this patent is extended or adjusted under 35 U.S.C. 154(b) by 112 days.

(21) Appl. No.: 13/020,867

(22) Filed: Feb. 4, 2011

(65) Prior Publication Data

US 2011/0202984 A1  Aug. 18, 2011

Related U.S. Application Data

(60) Provisional application No. 61/304,572, filed on Feb. 15, 2010.

(51) Int. Cl.
*G06F 7/04* (2006.01)
*G06F 21/00* (2013.01)
*H04L 29/06* (2006.01)

(52) U.S. Cl.
USPC ............. 726/7; 726/2; 726/4; 726/5; 726/8; 726/16; 726/17; 726/18; 726/26; 726/29; 726/30; 726/34; 713/159; 713/161; 713/171; 713/182; 713/183; 713/184; 713/193; 713/194; 713/400; 713/502

(58) Field of Classification Search
USPC .................. 726/7; 713/171, 183–184, 193
See application file for complete search history.

(56) References Cited

U.S. PATENT DOCUMENTS

| | | | |
|---|---|---|---|
| 7,302,570 B2 * | 11/2007 | Beard et al. | 713/171 |
| 8,094,812 B1 * | 1/2012 | Tsang et al. | 380/28 |
| 8,200,978 B2 * | 6/2012 | LI | 713/184 |
| 8,220,039 B2 * | 7/2012 | Gonzalez et al. | 726/9 |
| 2004/0059952 A1 * | 3/2004 | Newport et al. | 713/202 |
| 2007/0101442 A1 * | 5/2007 | Bondurant | 726/34 |
| 2007/0130463 A1 * | 6/2007 | Law et al. | 713/168 |
| 2008/0034216 A1 * | 2/2008 | Law | 713/183 |
| 2008/0072060 A1 * | 3/2008 | Cannon et al. | 713/185 |

(Continued)

FOREIGN PATENT DOCUMENTS

WO  2007/008540 A2  1/2007

OTHER PUBLICATIONS

PCT Search Report dated Apr. 8, 2011 for PCTUS2011/024271 filed Feb. 10, 2011.

(Continued)

*Primary Examiner* — Edan Orgad
*Assistant Examiner* — Jenise Jackson
(74) *Attorney, Agent, or Firm* — Quinn Law Group, PLLC

(57) ABSTRACT

This invention relates to a method and a system for generating user passcodes for each of a plurality of transaction providers from a mobile user device. A method and system for activating a plurality of passcode generators on a user device configured with a passcode application installed on the user device is provided. Each of the passcode generators may correspond to a different user account or transaction provider, such that each passcode generator provides a user passcode configured for the corresponding account or transaction provider. One or more of the passcode generators may include a passcode generating algorithm and a passcode key. Access to one or more of the passcode generators may require providing a PIN or a challenge.

16 Claims, 2 Drawing Sheets

(56) References Cited

U.S. PATENT DOCUMENTS

| | | | |
|---|---|---|---|
| 2008/0148389 A1* | 6/2008 | Locker et al. | 726/17 |
| 2008/0263646 A1* | 10/2008 | Jerez | 726/6 |
| 2009/0328165 A1* | 12/2009 | Cook et al. | 726/6 |
| 2010/0107229 A1* | 4/2010 | Najafi et al. | 726/6 |
| 2010/0180328 A1* | 7/2010 | Moas et al. | 726/6 |
| 2011/0093351 A1* | 4/2011 | Afana | 705/16 |
| 2011/0113245 A1* | 5/2011 | Varadarajan | 713/168 |
| 2011/0113476 A1* | 5/2011 | Moutarazak | 726/6 |
| 2011/0197266 A1* | 8/2011 | Chu et al. | 726/5 |

OTHER PUBLICATIONS http://www.rsa.com/rsalabs/otps/datasheets/OTP_WP_0205.pdf.
ftp://ftp.rsasecurity.com/pub/otps/ct-kip/ct-kip-v1-0.pdf.

* cited by examiner

METHOD AND SYSTEM FOR MULTIPLE PASSCODE GENERATION

CROSS-REFERENCE TO RELATED APPLICATIONS

This application claims the benefit of U.S. Provisional Patent Application No. 61/304,572, filed on Feb. 15, 2010, which is hereby incorporated by reference in its entirety.

TECHNICAL FIELD

This invention relates to a method and a system for generating user passcodes for each of a plurality of transaction providers from a mobile user device.

BACKGROUND

Many methods exist for providing a dynamic passcode value, which is often referred to as a one time passcode (OTP), including OTP keyfobs and Universal Serial Buses (USBs), smart cards and various software solutions. Each keyfob, smartcard, etc., is typically dedicated to a single user account from a single provider. A user with multiple accounts from one or more providers or institutions may be required to obtain, possess, and use a separate keyfob or passcode generating device for each account. This presents an inconvenience for the user, requiring the user to carry and maintain multiple pieces of hardware to obtain user passcodes corresponding to each of a plurality of user accounts.

SUMMARY

The ability to conveniently obtain user passcodes from a single user device for each of a number of accounts or transaction providers, where the user device is preferably a mobile device such as a mobile phone or a personal digital assistant (PDA), presents numerous advantages to the user. User convenience is enhanced by having to possess and access only one device to obtain passcodes for any of a plurality of accounts with any of a plurality of transaction providers. Security of the passcode generators is enhanced due to consolidation of a number of passcode generators on a single device, e.g., the user's mobile phone or PDA, which is typically kept on or close to the user's person and which is frequently monitored by the user. The probability that the user's mobile device and passcode generators provided thereon may be misplaced, lost, or stolen is reduced in comparison with the probability of misplacement or loss of an individual keyfob, USB, smart card, or other passcode generating device, which may be intermittently used, set aside or stored in various locations apart from the user. Convenience is further enhanced due to the mobility of the single passcode generating device, and accessibility from any location or at any time the user requires a passcode to complete a transaction.

Accordingly, a system and method are provided for activating a plurality of passcode generators on a user device via a passcode application installed on the user device. The user device may be, for example, a mobile phone or PDA. Each of the passcode generators on the user device may correspond to a different user account or transaction provider, such that each passcode generator provides a user passcode configured for the corresponding account or transaction provider.

The method may include installing a passcode application on the user device and activating a plurality of passcode generators on the user device using the passcode application. Each of the plurality of provider passcode generators is configurable to provide a user passcode for a transaction between a user and the corresponding provider associated with the passcode generator. The method may further include accessing one or more provider interfaces via the user device and/or passcode application to receive information configured to activate a passcode generator corresponding to the provider on the user device. Installing the passcode application on the user device may include installing one or more algorithms which may be configured to generate passcodes. Further, a provider passcode key may be obtained by the passcode application and used to configure and/or activate a corresponding provider passcode generator on the user device. A PIN and/or challenge may be required to access the passcode application and/or one or more of the provider passcode generators.

The system may include a passcode application. The passcode application may be used to configure and/or to activate a plurality of passcode generators on a user device. The user device may be configured to receive the passcode application. A provisioning server may be configured to provide the passcode application to the user device, and a plurality of provider interfaces each configurable to provide passcode information related to the corresponding provider. Each of the plurality of provider passcode generators may be configured for activation on the user device to communicate with a corresponding provider server, to obtain passcode information to activate each provider passcode generator on the user device such that the user can obtain a provider passcode configured as a user passcode for the corresponding provider. The system may include one or more algorithms, wherein each of the algorithms may be configured to generate at least one provider passcode. The system may further include one or more keys, wherein each of the keys may be configured to generate a respective provider passcode which corresponds to the user's account with that respective provider. The system may generate a PIN and/or challenge for input to access the passcode application and/or to access one or more of the provider passcode generators.

The above features and advantages and other features and advantages of the present invention are readily apparent from the following detailed description of the best modes for carrying out the invention when taken in connection with the accompanying drawings.

DETAILED DESCRIPTION

Figure 1:
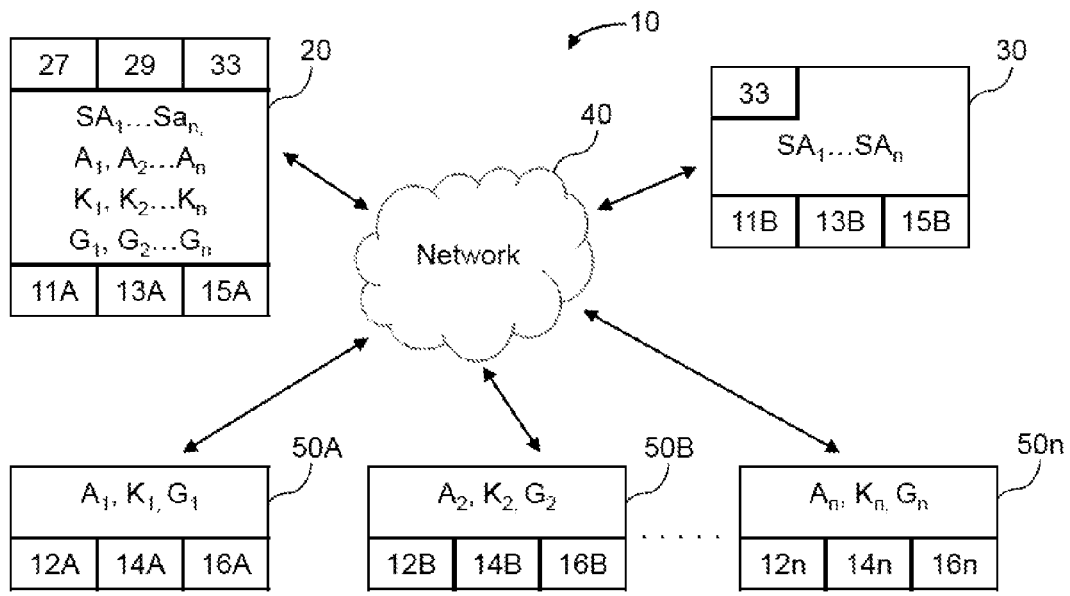
FIG. 1 is a schematic illustration of a user device-based system for generating a user passcode for each of a plurality of providers.

Referring to the drawings, wherein like reference numbers correspond to like or similar components throughout the several figures, there is shown in FIG. 1 a schematic illustration of a system 10 for generating a user passcode for each of a plurality of providers on a user device. The system 10 includes a user device 20, which may be any of a variety of user mobile phones, personal digital assistances (PDAs) and handheld devices (iPhone™, Blackberry™, etc.). The system 10 includes a provisioning server 30, and a plurality of provider servers 50A, 50B ... 50n, which are each configured to communicate with and/or through a network 40, which may be, for example, the internet.

The user device 20 is configured to communicate with the network 40 through an interface 15A, which may be a modem, mobile browser, wireless internet browser or similar means. The user device 20 further includes a memory 13A, a central processing unit (CPU) 11A and one or more algorithms which may be one or more standard algorithms ($SA_n$) or other algorithms ($A_n$) adaptable as passcode-generating algorithms. Memory 13A can include, by way of example, Read Only Memory (ROM), Random Access Memory (RAM), electrically-erasable programmable read only memory (EEPROM), etc., of a size and speed sufficient for executing one or more algorithms $SA_1 \ldots SA_n, A_1, A_2 \ldots A_n$ and/or one or more passcode generators $G_1, G_2 \ldots G_n$ activated on the user device 20. The user device 20 further includes a display 29 configurable to display a passcode application, a passcode menu, passcodes and/or challenges. The user device 20 includes an input 27 configured to receive input from the user, e.g., a keypad through which the user may key in a PIN and/or a challenge, a camera configured to receive a retinal scan, a fingerprint pad, an electronic receiver, or a combination of these. A passcode application 33, which may include one or more standard algorithms $SA_1 \ldots SA_n$ and/or other software, may be provided and installed on the user device 20 from the provisioning server 30, through the network 40.

The provisioning server 30 is adapted to communicate with the network 40 through an interface 15B, which may be a modem, website or similar means. The provisioning server 30 further includes a memory 13B, a CPU 11B, one or more algorithms which may be one or more standard algorithms ($SA_n$) or other algorithms ($A_n$) adaptable as passcode generating algorithms, and a passcode application 33. The memory 13B can include, by way of example, ROM, RAM, EEPROM, etc., of a size and speed sufficient for configuring, providing and activating the passcode application 33 on the user device 20, through the network 40.

Still referring to FIG. 1, the system 10 further includes a first provider server 50A, which corresponds to a first provider and which may be configured to communicate with the network 40 through a first provider interface 16A e.g., a first provider website. The first provider server 50A includes a memory 14A and a CPU 12A. the first provider server 50A may be configured to provide a first provider algorithm $A_1$ and/or a first passcode key $K_1$, where the algorithm $A_1$ and/or the passcode key $K_1$ may be configured to provide a first passcode generator $G_1$. The algorithm $A_1$, the passcode key $K_1$, and/or the passcode generator $G_1$ may be configured to generate a user passcode configured for use with the first provider. Memory 14A can include, by way of example, ROM, RAM, EEPROM, etc., of a size and speed sufficient for configuring, providing and/or activating an algorithm $A_1$, a passcode key $K_1$ and/or a passcode generator $G_1$ on the user device 20, through the network 40 and/or the passcode application 33.

System 10 further includes at least a second provider server 50B corresponding to a second provider. The provider server 50B may be configured similarly to the provider server 50A, e.g., the second provider server 50B may be configured to communicate with a network 40 through a second provider interface 16B which may be, for example, a website of the second provider. The second provider server 50B includes a memory 14B and a CPU 12B and may be configured to provide a second provider algorithm $A_2$ and/or a passcode key $K_2$. The algorithm $A_2$ and/or the passcode key $K_2$ may be configured to provide a second passcode generator $G_2$. The algorithm $A_2$, the passcode key $K_2$, and/or the second passcode generator $G_2$ may be configured to generate a user passcode configured for use with the second provider. The memory 14B can include, by way of example, ROM, RAM, EEPROM, etc., of a size and speed sufficient for configuring, providing and/or activating an algorithm $A_2$, passcode key $K_2$ and/or passcode generator $G_2$ on the user device 20, through the network 40 and/or phone passcode application 33.

System 10 may include a plurality of additional provider servers generally indicated as 50n, and corresponding to a plurality of additional providers, wherein the nth server 50n corresponds to an nth provider. As discussed previously, the server 50n may be configured similarly to the provider server 50A, e.g., the nth provider server 50n may be configured to communicate with the network 40 through a nth provider interface 16n which may be, for example, a website of the nth provider. The nth provider server 50n includes a memory 14n and a CPU 12n and may be configured to provide a second provider algorithm $A_n$ and/or a passcode key $K_n$, where the algorithm $A_n$ and/or the passcode key $K_n$ may be configured to provide a passcode generator $G_n$. The algorithm $A_n$, the passcode key $K_n$, and/or the nth passcode generator $G_n$, may be configured to generate a user passcode configured for use with the nth provider. The memory 14n can include, by way of example, Read Only Memory (ROM), Random Access Memory (RAM) electrically-erasable programmable read only memory (EEPROM), etc., of a size and speed sufficient for configuring, providing and/or activating an algorithm $A_n$, a passcode key $K_n$ and/or a passcode generator $G_n$ on the user device 20, through the network 40 and/or the passcode application 33.

Figure 2:
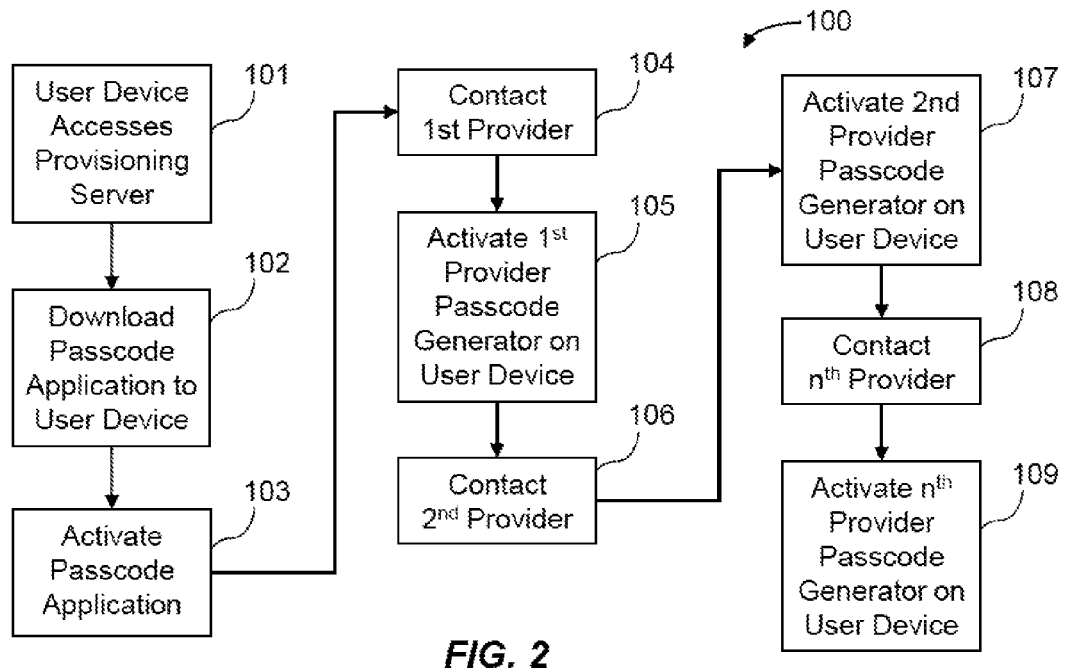
FIG. 2 is a graphical flow chart describing a method for activating a plurality of passcode generators on a user device.
Figure 3:
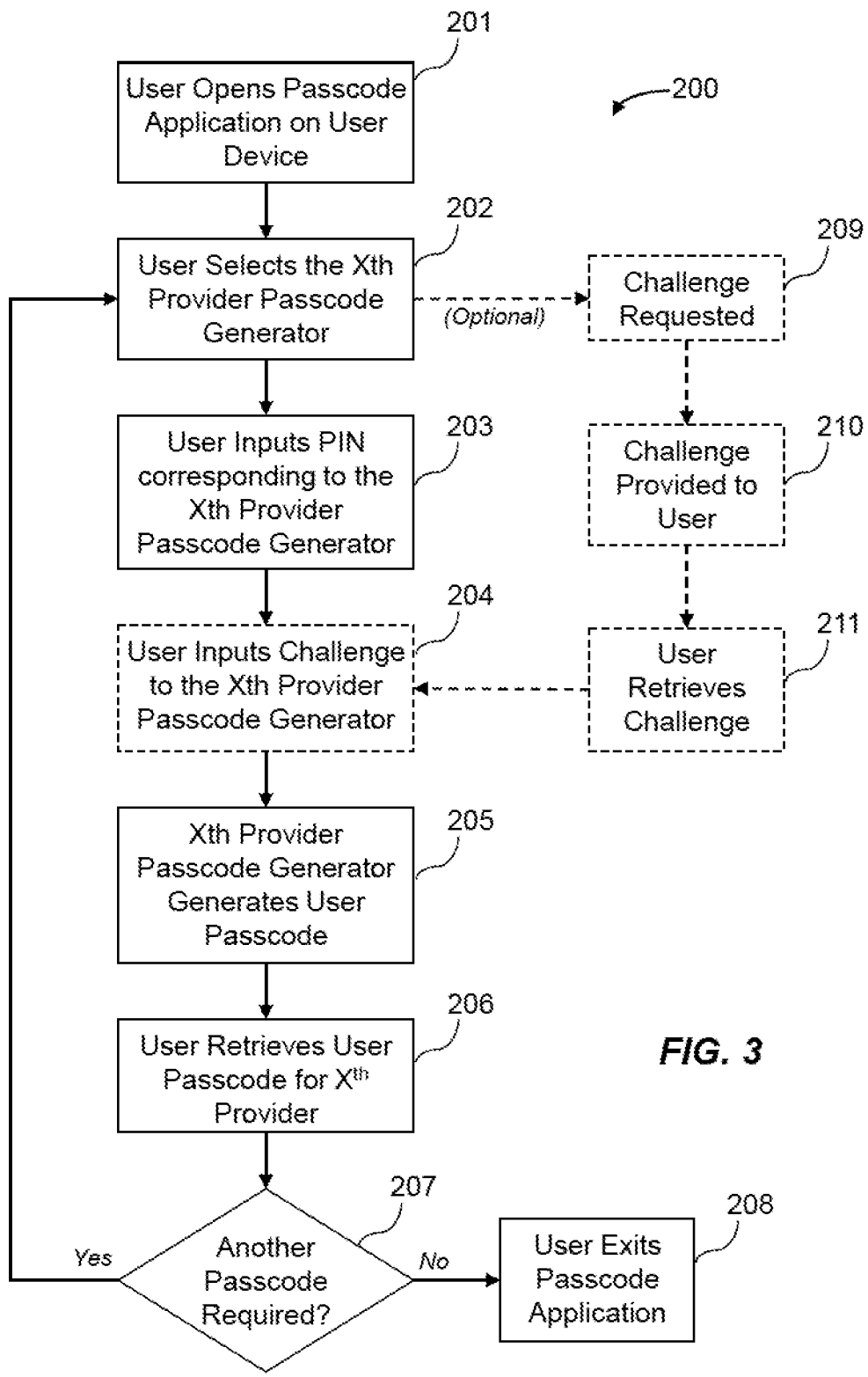
FIG. 3 is a graphical flow chart describing a method for obtaining a passcode from one of a plurality of passcode generators on a user device.

Referring now to FIGS. 2 and 3, a method for providing a plurality of passcode generators $G_1 \ldots G_n$ on a user device 20 is provided, which may include installing a passcode application 33 on the user device 20 and activating the plurality of passcode generators $G_1 \ldots G_n$ on the user device 20 via the passcode application 33, wherein each of the plurality of passcode generators $G_1 \ldots G_n$ is configurable to provide a user passcode for a transaction between the user and the provider corresponding to the provider passcode generator $G_1 \ldots G_n$ on the user device 20.

Shown in FIG. 2 and indicated generally at 100, is a graphical flow chart describing one possible method for activating a plurality of passcode generators on a user device 20. Referring to FIG. 2, referencing the system 10 of FIG. 1, and beginning with step 101, a user, through a user device 20, accesses a provisioning server 30 to download, at step 102, a passcode application 33 to the user device 20. The user may be required to provide a user name, user device information or other identifying and authenticating information as needed to activate, at step 103, the passcode application 33 on the user device 20. The provisioning system 30 may provide the user an activation code, which the user may be required to input at step 103 to activate the passcode application 33 installed on the user device 20. The passcode application 33 may include one or more standard algorithms $SA_1 \ldots SA_n$ which may be adaptable to generate passcodes using a key $K_1 \ldots K_n$ configured by a provider and provided to the user device 20. Standard algorithms $SA_1 \ldots SA_n$ may be, by way of example and not intended to be limiting in scope, one or more algorithms adopted and/or approved by the Initiative for Open Authentication (OATH), such as a hash-based message authentication code (HMAC) one time password (HOTP) algorithm, a time-based one time password (TOTP) algorithm, a one time password challenge/response algorithm (OCRA) or other OATH-approved algorithm.

Continuing with step 104 of FIG. 2, the user contacts the first provider 50A through, for example, a first provider interface 16A (referring for FIG. 1), using the user device 20 and the passcode application 33. The user provides information to the first provider 50A as required to activate a first provider passcode generator $G_1$ on the user device 20. For example, the user may be required to provide to the first provider system 50A the user's account number for the first provider, user device information, such as the type or model of the user device, user contact information which may include a phone number or email address, to install or configure a first provider passcode generator $G_1$ via the passcode application 33 on the user device 20, and/or an access code previously communicated by first provider system 50A to the user.

At step 105 of FIG. 2, the first passcode generator $G_1$ is downloaded to the user device 20 and the passcode application 33. The user provides, if required, additional input to activate the first passcode generator $G_1$ on the user device 20. For example, the user may be required to input an activation code to complete step 105. The user may additionally be required to input a PIN either provided by the first provider or established by the user during the activation session with the first provider, to access the first provider passcode generator $G_1$ on the user device 20.

The first provider passcode generator $G_1$ is configured to generate, on the user device 20, passcodes retrievable by the user for use in transactions with the first provider. The first passcode generator $G_1$ may be configured by the first provider system 50A and installed to the passcode application 33 on the user device 20. Alternatively, a first algorithm $A_1$ may be installed to the passcode application 33, which may be a non-standard algorithm $A_1$ which is proprietary to the first provider, or the first provider may select an algorithm from the standard algorithms $SA_1 \ldots SA_n$ included in the passcode application 33 to configure a first passcode generator $G_1$ on user device 20. The first provider system 50A may provide a first key $K_1$ which is uniquely configured for the user's first provider account. The first key $K_1$ may be adaptable for use with an algorithm $A_1$ to configure the first passcode generator $G_1$. As discussed previously, the algorithm $A_1$ may be a standard algorithm provided by the passcode application 33 or may be a proprietary or non-standard algorithm provided by the first provider system 50A. The first key $K_1$ may be, for example, a symmetric key, a non-symmetric key, a data encryption standard (DES) key, an advanced encryption standard (AES) key, a secret, a secret byte array, a card verification key (CVK), a unique derivation key (UDK), a unique DEA key A (UDKA), a unique DEA key B (UDKB), a seed or an indexed key list. Additionally, the first key $K_1$ may be encrypted, obfuscated, cryptographically camouflaged or otherwise secured by the first provider system 50A and/or the passcode application 33 prior to being used to configure the first passcode generator $G_1$.

After the first passcode generator $G_1$ is installed and activated on the user device 20, the user may continue at step 106 to contact a second provider system 50B, again using the passcode application 33 and the user device 20, to install and activate at step 107 a second passcode generator $G_2$ corresponding to a different user account, e.g., a user account with the second provider, using a method as discussed previously for the first provider and the first passcode generator. Similarly, after the second passcode generator $G_2$ is installed and activated on the user device 20, the user may continue at step 108 to contact a third provider system, again using the passcode application 33 and the user device 20, to install and activate at step 109 a third passcode generator corresponding to a different user account, e.g., a user account with the third provider, using a method as discussed previously for the first provider and first passcode generator. Steps 108 and 109 may be repeated to contact nth provider systems 50n and to activate nth passcode generators $G_n$ using the passcode application 33 on the user device 20.

Each of the algorithms $SA_1 \ldots SA_n$ may be any standard algorithm which may be configured or used for passcode generation, including any OATH-approved algorithm such as a HOTP algorithm, a TOTP algorithm, an OCRA algorithm or other OATH-approved algorithm. Each of algorithms $A_1 \ldots A_n$ may be a standard algorithm $SA_1 \ldots SA_n$ or may be another algorithm which may be proprietary to one or more of the provider systems 50A . . . 50n. Each of the keys $K_1 \ldots K_n$ may be, for example, a symmetric key, a non-symmetric key, a DES key, an AES key, a secret, a secret byte array, a CVK, a UDKA, a UDKB, a seed or an indexed key list. Additionally, each of the keys $K_1 \ldots K_n$ may be encrypted, obfuscated, cryptographically camouflaged or otherwise secured by its respective provider system 50A . . . 50n and/or the passcode application 33 prior to provided to the user device 20 and/or adapted to produce a respective passcode generator $G_1 \ldots G_n$.

For illustrative example and not intended to be limiting in scope, referring again to FIGS. 1 and 2, a first provider 50A may be a banking institution providing a passcode generator $G_1$ to a user for the user's ATM account. The first passcode generator $G_1$ may be configured with an algorithm $A_1$, which may be proprietary or unique to the banking institution, and a key $K_1$ which is unique to the user's ATM account, such that the first passcode generator $G_1$ is configured to generate a one-time PIN or passcode (OTP) on the user device 20. The OTP generated on the user device 20 may be provided as a single use PIN for an ATM transaction corresponding to the user's ATM account and verifiable as the user's PIN by the banking institution 50A. Continuing, for example, a second provider 50B may be the user's employer providing a passcode generator $G_2$ to the user device 20 corresponding to the user's account on the employer's network or VPN. The second passcode generator $G_2$ may be configured with a standard TOTP algorithm, $SA_1$, and the second passcode generator $G_2$ may be configured to generate a dynamic user passcode at a set time increment, for example, every 60 seconds, on the user device 20. The user may enter the generated dynamic user passcode with a user ID and/or PIN to gain access to the employer VPN. A third passcode generator $G_3$, for example, may be configured to generate a dynamic card verification value (CVV) for use as the CVV or security code associated with a credit card account, such as a Mastercard™ or Visa™ account. The third passcode generator $G_3$ may be configured with an algorithm, which may be a standard algorithm SA2 or a proprietary algorithm $A_2$, and may be further configured with a key $K_2$ which is unique to the user's credit card account. The third passcode generator $G_3$ may be configured to generate a CVV which is usable for a predetermined number of transactions, for example, for a predetermined number of online purchases made with the user's corresponding Mastercard™ or Visa™ The nth passcode generator $G_n$, again by way of example, may be configured to generate a dynamic (one-time or temporary) authorization code which must be inputted online in conjunction with other authenticating information to authorize a secured transaction, for example, a sale of securities by a nth provider broker or release of medical information by a nth provider medical insurer. The collective first through nth passcode generators $G_1 \ldots G_n$ are installed and activated via the passcode application 33 on the user device 20, providing the capability for the user, through the user device 20, to conveniently generate and retrieve a plurality of dynamic passcode values each generated from a unique passcode generator and/or key and corresponding to a different provider account or system with which the user conducts transactions.

A passcode generator may be configured to provide more than one passcode corresponding to more than one provider, by activating more than one passcode key on the generator usable with that generator's passcode algorithm. For illustrative example, and not intending to be limiting in scope, a credit card passcode generator $G_1$ may be configured by the passcode application 33 with an algorithm $SA_1$ which can provide passcodes for a variety of credit cards, for example, Visa™ and Mastercard™ credit cards. The passcode application 33, when activating a new provider account, would recognize whether the new provider account corresponds to the existing passcode generator $G_1$ and passcode algorithm $SA_1$, and, rather than configure a new passcode generator for the new provider, instead may configure the existing passcode generator $G_1$ for the new provider account. For example, a first passcode key $K_1$ may be activated on a credit card passcode generator $G_1$ corresponding to a user's first Visa™ account with a first provider 50A. A second passcode key $K_2$ may be activated on the same credit card passcode generator $G_1$ corresponding to a user's Mastercard™ account, where the Mastercard™ provider uses the same passcode generating algorithm $SA_1$ as the first Visa™ provider 50A. A third passcode key $K_3$ may be activated on the same credit card passcode generator $G_1$ corresponding to a user's second Visa™ account, where the second Visa™ provider 50D (wherein provider 50D is one of a plurality of additional provider servers generally indicated as 50n) uses the same passcode generating algorithm $SA_1$ as the first Visa™ provider 50A. A fourth passcode key $K_4$ may be activated on the same credit card passcode generator $G_1$ corresponding to a user's retailer/merchant credit card, where the retailer/merchant credit card provider system 50E (wherein provider 50E is another of a plurality of additional provider servers generally indicated as 50n) uses the same passcode generating algorithm $SA_1$ as the Mastercard™ and first and second Visa™ provider systems 50A, 50C, 50D, and so on. In this manner, further convenience is enjoyed by the user, who may select from multiple provider accounts within a single passcode generator $G_1$ to obtain a passcode for the selected account. Efficiency is gained by configuring multiple user accounts on the same account generator $G_1$, by reducing, for example, the memory required to store and operate multiple account passcode generators on a single user device.

Referring now to FIG. 3, illustrated is a graphical flow chart describing a method generally indicated at 200 for obtaining a passcode from one or more of a plurality of passcode generators on the user device 20. As shown in FIG. 3, and referencing the system elements of FIG. 1, a user at step 201 opens the passcode application 33 on the user device 20, where the passcode application 33 has already been populated by a plurality of activated provider passcode generators $G_1 \ldots G_n$. Each of the provider passcode generators $G_1 \ldots G_n$ is configured to generate a passcode for the user which is recognizable by the provider corresponding to the passcode generator as a verifiable passcode from the user and corresponding to the user's provider account. As discussed previously, by way of example and not to be limiting in scope, a provider may be a banking institution providing a passcode usable as a PIN for an ATM transaction or online transaction; a secure network providing an passcode to authenticate the user for access to a VPN or other secure network; a credit/debit card issuer providing a passcode which may be used as a CVV for an online payment transaction, or a services provider such as a brokerage, a medical provider, or an insurance carrier providing a passcode for authorization of release of funds or confidential information. The user, at step 202, accesses the passcode application 33 and selects the provider passcode generator corresponding to the provider for which the user requires a passcode. For example, the user may be conducting a transaction with a provider system 50X corresponding to a provider X, wherein provider system 50X is one of the plurality of additional provider systems generally indicated as 50n. As shown in FIG. 3, the user selects the Xth provider passcode generator $G_x$, wherein $G_x$ is one of the passcode generators $G_1 \ldots G_n$ selectable from a menu or other display 29 provided by the passcode application 33. The passcode application 33 may provide a menu or other display as a listing of the provider names depicted in text or pictorially, for example, by displaying logos corresponding to each provider, or by any other means suitable to facilitate user convenience in selecting the desired provider passcode generator $G_x$ at step 202.

At step 203, the user inputs a PIN corresponding to the Xth provider passcode generator G. The PIN may be in any configuration which can be input into user device 20. By way of non-limiting example, the PIN may be a character string of one or more alpha-numeric or special characters inputted into the keypad, a picture or a graphic selected from the device screen, a challenge transmitted to the user's device as a short message service (SMS) message, text message or voice mail, a datum or an electronic signal transmitted from the user device 20, a retinal scan provided to the user device's camera, or a fingerprint provided to a print pad on the user device 20. The PIN input may be provided by the user device 20 automatically, for example, the PIN may be provided by passcode application 33, or as a device identifier which is unique to or generated by the user's device 20. This latter example provides additional security that the passcode application 33 and/or the passcode generator $G_x$ has not been ported or copied over to another (unauthorized) device, by requiring a user device parameter or identifier that is unique to the user device 20 as the PIN. Alternatively, step 202 may be optional, e.g., a PIN input may not be required to generate a passcode. In this configuration, the process may proceed directly from user selection of the provider passcode generator $G_x$ at step 202 to the passcode generation at step 205, without further user input.

Following input of the user PIN corresponding to the passcode generator $G_x$ at step 203, the user may optionally be required to input a challenge at step 204. The challenge, as previously discussed for the PIN, may be in any configuration which can be input into the user device 20. For example, the challenge may be configured as a character string of one or more alpha-numeric or special characters, a picture or graphic, a datum or an electronic signal, a retinal scan or a fingerprint. At optional step 209, a request for a challenge may be initiated by the passcode application 33 or by passcode generator G. The challenge is provided to the user at optional step 210, by any suitable means, for example, as a SMS text message, email or voice mail. The challenge may be provided, for example, as a value, as an instruction requiring the user to input the purchase or payment amount of the transaction, or as a challenge question requiring the user to input an answer which may be known only by the user. The user retrieves the challenge at optional step 211 and at optional step 204 inputs the challenge value to the provider passcode generator G.

After the user has input the PIN at step 203, and if required to do so, after the user has input a challenge to the passcode generator $G_x$ at step 204, the passcode generator $G_x$ at step 205 generates a user passcode corresponding to the user's Xth provider account. The user retrieves the user passcode for use in a transaction with the Xth provider at step 206 by any suitable means. For example, if the passcode is provided to the display 29 of the user device 20 in human readable characters, the user may read the passcode from the display 29 to retrieve it for input into the Xth provider interface or another transaction interface in communication with the Xth provider system 50X.

Referring now to step 207, if the user requires another passcode for a subsequent transaction with a different provider, the user selects, at step 202, the passcode generator corresponding with the different provider, and repeats steps 203 through 206 as required for that provider's passcode generator. Alternatively, at step 207, if the user does not require any further passcodes at the present time, the user may exit the passcode application at step 208.

Various optional configurations of the passcode application are possible. For example, the passcode application 33 may be further secured with a separate PIN, or may be secured by a locking mechanism(s) available on the user device 20. The PIN for a first, second and nth passcode generator may be configured as the same PIN, e.g., having the same PIN value, for all passcode generators, increasing user convenience by decreasing the number of PIN values the user must memorize. One or more of the passcode generator keys $K_1 \ldots K_n$ may be cryptographically camouflaged such that the input of an invalid PIN may produce a passcode which is formatted for input into the provider interface, however the passcode generated in response to the invalid PIN will also be invalid, e.g., the invalid passcode provided will not be verifiable as a user passcode for the user's account if input into the provider interface.

The passcode application may configure a passcode generator on the user device, using a standard or recognized algorithm provided by the passcode application and a unique key generated by the provider and specific to the user account. The provider interface may send a proprietary (non-standards and/or unique) provider algorithm and a user account-specific key to the passcode application for the passcode application to configure as a passcode generator on the user device. Alternatively, the passcode application may receive the provider passcode generator directly from the provider, fully configured for the user's account.

Additional advantages, such as the ability to reset the passcode counter for a passcode generator through the user device may be provided, eliminating the inconvenience of contacting a provider in the event of passcode nonsynchrony. The various passcode generators provided by the passcode application may be updated automatically on the user device and without the need to replace the passcode generating hardware or the user's account card, as may be the instance if the passcode generator was configured as a provider dedicated keyfob or USB or, if the users card was configured as a passcode-generating smart card.

While the best modes for carrying out the invention have been described in detail, those familiar with the art to which this invention relates will recognize various alternative designs and embodiments for practicing the invention within the scope of the appended claims.

The invention claimed is:

1. A method for activating a plurality of passcode generators on a user device, comprising:
    installing a passcode application on the user device;
    receiving on the user device a first passcode generator defined by a first provider;
    activating the first passcode generator on the user device using the passcode application;
    obtaining a first passcode from the first passcode generator, wherein the first passcode is configured as a user passcode for a transaction between a user and a first provider;
    receiving on the user device a second passcode generator defined by a second provider;
    activating the second passcode generator on the user device using the passcode application;
    obtaining a second passcode from the second passcode generator, wherein the second passcode is configured as a user passcode for a transaction between the user and the second provider; and
    activating one of the first passcode generator and the second passcode generator to provide a third passcode configured as a user passcode for a transaction between the user and a third provider, using the passcode application;
    obtaining the third passcode from the one of the first passcode generator and the second passcode generator.

2. The method of claim 1, wherein installing the passcode application includes installing at least one algorithm.

3. The method of claim 1, further comprising:
    accessing the first provider interface via the user device and receiving information from the first provider interface, wherein the information is configured to activate the first passcode generator on the user device; and
    accessing the second provider interface via the user device and receiving information from the second provider interface, wherein the information is configured to activate the second passcode generator on the user device.

4. The method of claim 3, wherein the information received includes a passcode key.

5. The method of claim 3, wherein the information received includes a passcode key, and wherein the passcode key is encrypted by cryptographically camouflaging the passcode key using the passcode application.

6. The method of claim 1,
    wherein activating the first passcode generator includes activating at least one of a first algorithm and a first passcode key on the user device, wherein each of the first algorithm and the first password key is configured to generate the first passcode; and
    wherein activating the second passcode generator includes activating one of a second algorithm and a second passcode key on the user device, wherein each of the second algorithm and the second passcode key is configured to generate the second passcode.

7. The method of claim 6, further comprising:
    activating a third passcode key on one of the first passcode generator and the second passcode generator, wherein the third passcode key is configured to generate a third passcode, and wherein the third passcode is configured as a user passcode for a transaction between the user and a third provider.

8. The method of claim 7, wherein one of the first algorithm and the second algorithm is configured as a non-standard algorithm.

9. The method of claim 1, further comprising:
    inputting at least one PIN into the user device, wherein said at least one PIN is at least one of an access PIN to access the passcode application, a first PIN to obtain the first passcode, and a second PIN to obtain the second passcode.

10. The method of claim 9, wherein two or more of the access PIN, the first PIN and the second PIN are the same PIN.

11. The method of claim 1, further comprising one of inputting a challenge into the first passcode generator to obtain the first passcode, and inputting a challenge into the second passcode generator to obtain the second passcode.

12. A system for activating a plurality of passcode generators on a user device, the system including:
   a passcode application configured to activate a plurality of passcode generators;
   a user device configured to receive the passcode application;
   a provisioning server configured to provide the passcode application to the user device;
   a first provider interface configured to provide first passcode information;
   a second provider interface configured to provide second passcode information;
   a third provider interface configured to provide third passcode information;
   a first passcode generator defined by the first provider interface and configured for activation on the user device;
   a second passcode generator defined by the second provider interface and configured for activation on the user device;
   wherein:
      the user device is configured to communicate with the provisioning server;
      at least one of the user device and the provisioning server are configured to communicate with each of the first provider server and the second provider server;
      the passcode application uses the first passcode information to activate the first passcode generator on the user device such that the user can obtain a first passcode configured as a user passcode for a first provider;
      the passcode application uses the second passcode information to activate the second passcode generator on the user device such that the user can obtain a second passcode configurable as a user passcode for a second provider; and
      the passcode application uses the third passcode information to activate one of the first passcode generator and the second passcode generator such that the user can obtain a third passcode configured as a user passcode for a third provider.

13. The system of claim 12, further comprising:
   at least one algorithm recorded on the user device;
   wherein said at least one algorithm is one of a first algorithm executable by the passcode application on the user device to generate the first passcode and a second algorithm executable by the passcode application on the user device to generate said a second passcode.

14. The system of claim 12, further comprising:
   wherein at least one of the first passcode information and the second passcode information includes at least one key; and
   wherein the at least one key is at least one of a first key defined by the first provider and configured to generate the first passcode and a second key defined by the second provider and configured to generate the second passcode.

15. The system of claim 12, further including at least one PIN, wherein said at least one PIN is configured for input as one of an access PIN to access the passcode application, a first PIN to obtain the first passcode, and a second PIN to obtain the second passcode.

16. The system of claim 12, further including at least one challenge, wherein said at least one challenge is configured for input as one of a first challenge to obtain the first passcode, and a second challenge to obtain the second passcode.

* * * * *